(12) United States Patent
Nevell, Jr.

(10) Patent No.: US 7,527,320 B1
(45) Date of Patent: May 5, 2009

(54) PORTABLE VEHICLE DOOR AND BUMPER GUARD

(76) Inventor: Thomas J. Nevell, Jr., 22642 Barlovento, Mission Viejo, CA (US) 92692

( * ) Notice: Subject to any disclaimer, the term of this patent is extended or adjusted under 35 U.S.C. 154(b) by 0 days.

(21) Appl. No.: 11/973,574

(22) Filed: Oct. 9, 2007

Related U.S. Application Data

(60) Provisional application No. 60/849,809, filed on Oct. 6, 2006.

(51) Int. Cl.
B60R 19/42 (2006.01)

(52) U.S. Cl. ......................... 296/126; 296/128

(58) Field of Classification Search ................. 293/126, 293/127, 128
See application file for complete search history.

(56) References Cited

U.S. PATENT DOCUMENTS

| D278,895 | S | 5/1985 | Tanaka |
| D279,468 | S | 7/1985 | Marrinan et al. |
| D281,152 | S | 10/1985 | Luthe et al. |
| 4,561,685 | A * | 12/1985 | Fischer ................. 293/128 |
| D302,962 | S | 8/1989 | Collani |
| D308,504 | S | 6/1990 | Hensley |
| D308,661 | S | 6/1990 | Bailey |
| D309,593 | S | 7/1990 | Bailey |
| 5,060,994 | A | 10/1991 | Martin et al. |
| D333,457 | S | 2/1993 | La Foe et al. |
| 5,184,857 | A * | 2/1993 | Hawkins ................. 293/128 |
| D335,271 | S | 5/1993 | Davis |
| D338,647 | S | 8/1993 | Bailey |
| D422,954 | S | 4/2000 | Wilson |
| 6,186,564 | B1 * | 2/2001 | Ashcroft ................. 293/128 |
| D446,484 | S | 8/2001 | Martel |
| 6,533,346 | B2 | 3/2003 | Yu |
| 6,736,435 | B1 * | 5/2004 | Ditthavong ............. 293/128 |
| 2006/0108814 | A1 * | 5/2006 | Dunn .................... 293/128 |
| 2006/0220400 | A1 * | 10/2006 | Diamond ................. 293/126 |

* cited by examiner

*Primary Examiner*—Lori L Lyjak
(74) *Attorney, Agent, or Firm*—Robert C. Montgomery

(57) ABSTRACT

A foam guard system that attaches to the side and bumper areas of a parked vehicle to protect it from damage to paint and body is herein disclosed. The guard is made of closed cell polyethylene foam supported by a supporting interior core and secured in place by means of sturdy flexible strapping extending over the door, fender, and/or bumper areas.

12 Claims, 4 Drawing Sheets

PORTABLE VEHICLE DOOR AND BUMPER GUARD

RELATED APPLICATIONS

The present invention was first described in and claims the benefit of U.S. Provisional Application No. 60/849,809, filed on Oct. 6, 2006, the entire disclosures of which are incorporated herein by reference.

FIELD OF THE INVENTION

The present invention relates generally to a protective molding system for the exterior of motor vehicles and, more particularly, to molding that attaches to the side and bumper areas of a vehicle while parked that is made from cylindrical closed cell polyethylene supported by a rigid interior core and secured in place by means of sturdy flexible straps with removable fasteners.

BACKGROUND OF THE INVENTION

The exterior of motor vehicles while parked can become dented or worse by inconsiderate people who park too close in a parking lot thus damaging an automobile or truck with their doors when getting in and out of their vehicle. Vehicles equipped with body side molding have some protection, but many cars are sold with no such molding or molding that is merely decorative providing virtually no protection at all. Further, bumper areas on the front and rear of motor vehicles usually have no protective molding and are left exposed to potential damage. Accordingly, there exists a need for a means by which vehicle owners can protect their vehicles from damage. The development of the invention herein disclosed fulfills this need.

In appearance the invention resembles an extra wide body side molding that runs along the side door area, fender area and bumper area of an automobile. The molding is produced from suitable materials such as, but limited to, cylindrical closed cell polyethylene supported by a rigid interior core and secured in place using nylon straps and removable fasteners. To use the invention, the vehicle's operator after parking simply removes the set of the moldings from the trunk or other vehicle interior. The moldings are then extended over the door, fender, and bumper areas and secured in place with the nylon straps. The invention provides protection against dings and scratches from other vehicles that may park close and open their doors into the invention-equipped vehicle. The use of the innovative protective guards provides protection for automobiles and trucks against parking lot damage and theft in an efficient manner.

Several attempts have been made in the past to provide a protective bumper guard apparatus or similar removable structure for parked motor vehicles. U.S. Pat. No. 6,533,346 in the name of Yu discloses a vehicle door guard apparatus including a door handle pivotally attached to a vehicle door and pivotally attached to a n end of a rod, the other end of which is attached to a vehicle body. When the door is opened, the door handle is caused to be rotated outwardly to protrude from the vehicle door. Unfortunately, the Yu device does not provide a means to removably attach an elongated vehicle door and body bumper guard, which is placed at a desired area and affixed by means of elastic interconnecting straps and magnetic strips.

U.S. Pat. No. 5,060,994 in the name of Martin et al. teaches a vehicle door guard constructed of a one-piece resilient elongated body member with a slot in the center and two separated transverse hinge notches cut in the front surface to separate a first and second end portion of the body. Magnets are place in both the first and second portions to attach the device to a vehicle. Unfortunately, the Martin et al. device does not provide means for an elastic strapping assembly with locking members as an additional means of securing the apparatus thereto the vehicle. The Martin et al. device also does not comprise a conformable material as in the present invention.

None of the prior art particularly describes a protective device for removable attachment thereto a motor vehicle, comprising a conformable means to fully protect a desired area or areas from incidental damage or impact from a load or force.

SUMMARY OF THE INVENTION

In view of the foregoing disadvantages inherent in the prior art, it has been observed that there is need for a protective apparatus for a motor vehicle from incidental damage, particularly when the vehicle is parked or unattended for a length of time.

It is also an observation that such an apparatus absorbs a load forced thereupon and provides resistance thereto an inward motion of the load while protecting and cushioning the motor vehicle and comprises a conformable means that enables the apparatus to conform thereto various shapes and sizes of vehicle doors, fenders, bumpers, or other desired protective areas of said motor vehicle.

It is therefore an object of the present invention to provide such an apparatus further comprising a cushioning structure supported by a rigid interior core and secured in place thereto the motor vehicle by means of a strapping assembly providing a removable securement means. Such a strapping assembly permits secure installation of the apparatus thereto the motor vehicle along vehicle doors, fenders, bumpers, or other desired protective areas at user-selected heights and angles.

A further object of the present invention provides for a cushioning structure comprising a high-density foam, such as a cylindrical closed-cell polyethylene material, and further comprises an elongated structure approximately four (4) to six (6) feet long and a rectangular cross-section approximately six (6) inches square.

Yet another object of the present invention provides for the strapping assembly to further comprise a first strapping element, wherein a first proximal end is affixed thereto a top surface of the core, and having a female locking mechanism affixed thereto a distal end of the first strapping element and a first adjustment clip located thereon the first strapping element.

Yet another object of the present invention provides for the strapping assembly to further comprise a second strapping element, wherein a second proximal end is affixed thereto said top surface of said core; and having a male locking mechanism affixed thereto a distal end of said first strapping element and a second adjustment clip located thereon said second strapping element.

Yet another object of the present invention provides for the first and second wherein said first and second strapping element to each comprise at least one (1) piece of durable and resilient elastic material; preferably from one of the following list: polyurethane, natural rubber, polyester, polypropylene, or nylon.

Still yet another object of the present invention comprises the removable securement means, wherein the male and female locking mechanism comprise a two-piece interlocking side-release buckle device, wherein the male locking mechanism comprises two (2) extendable prongs at a proximal end separated by an aperture and a means for receiving the second strapping element at the second distal end thereof and the female locking mechanism comprises a main opening at a proximal end being sized to receive the male locking mechanism portion with two (2) apertures on each side thereof and a means for receiving the first strapping element at the first distal end thereof.

Still yet another object of the present invention wherein the first and second adjustment clips provide an adjustment means for lengthening, shortening, or otherwise adjusting the first and second strapping elements thereto a desired length.

Another object of the present invention provides for a waterproof protective fabric cover removable via a fastening mechanism, wherein the cover provides an enveloping and protective means thereto the cushioning structure and core and permits the passage of the first and second strapping elements. The protective fabric cover is then secured with a hook-and-loop fastener assembly.

Still yet another object of the present invention provides a plurality of magnetic strips equidistantly-spaced therein an interior surface of the cover and affixed thereto, wherein the magnetic strips provide a stable positioning means for the apparatus thereto a metallic surface of the motor vehicle. The plurality of magnetic strips further comprises a horizontal rectangular non-metallic material of construction.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| | |
|---|---|
| 10 | door and bumper guard |
| 15 | protective structure |
| 16 | foam |
| 17 | fabric cover |
| 18 | supporting core |
| 19 | hook-and-loop fastener |
| 20 | first strapping element |
| 21 | second strapping element |
| 30 | magnetic strip |
| 40 | first adjustment clip |
| 41 | second adjustment clip |
| 50 | female locking mechanism |
| 55 | male locking mechanism |
| 100 | vehicle |

DETAILED DESCRIPTION OF THE PREFERRED EMBODIMENT

Figure 1A:
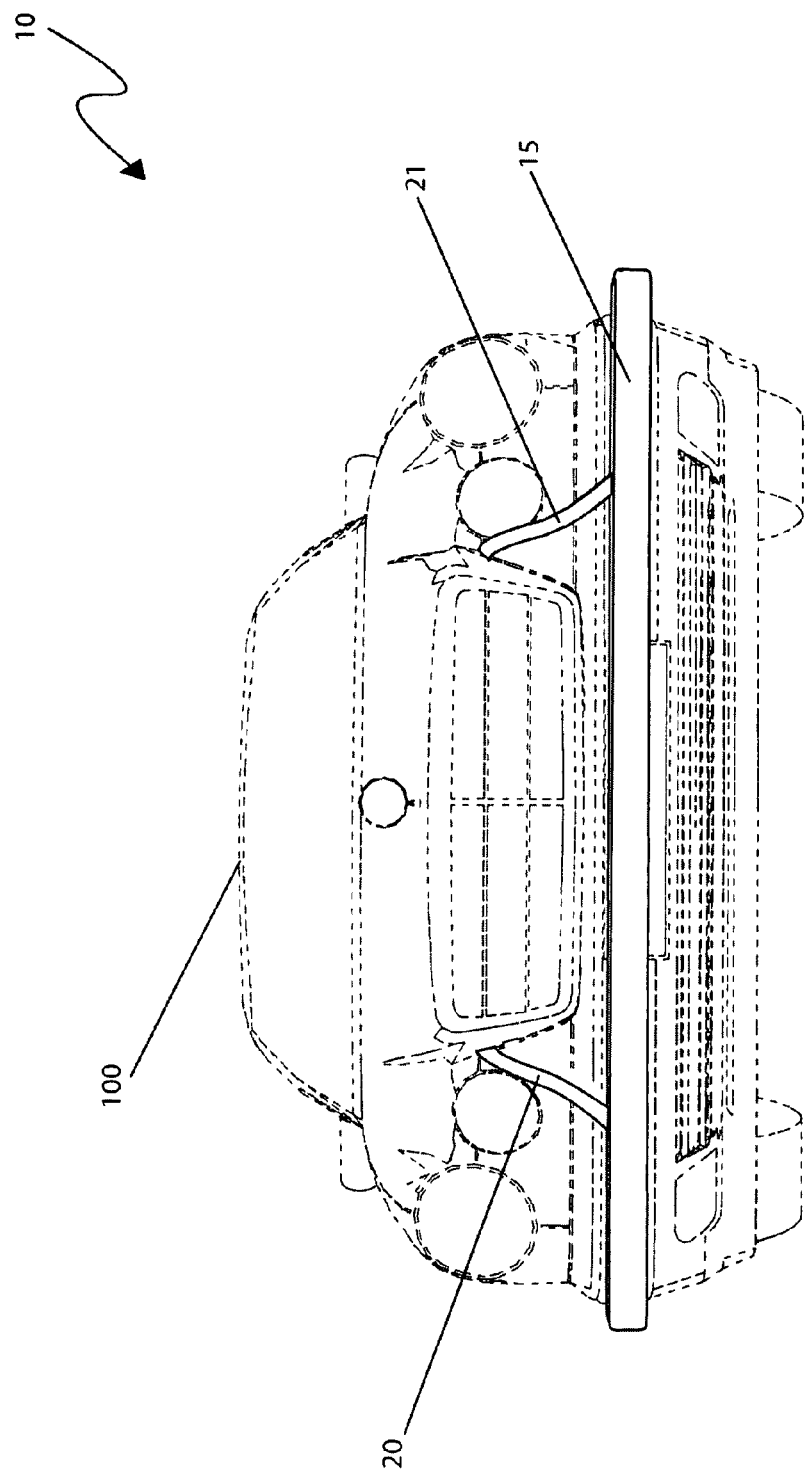
FIG. 1a is an environmental view depicting a front application of a portable vehicle door and bumper guard 10 thereto a vehicle 100, according to a preferred embodiment of the present invention; and, FIG. 1b is an environmental view depicting a side application of a portable vehicle door and bumper guard 10 thereto a vehicle 100, according to a preferred embodiment of the present invention; and, FIG. 2 is a front perspective view of a portable vehicle door and bumper guard 10, according to a preferred embodiment of the present invention; and, FIG. 3 is a rear close-up view of a protective structure portion 15 of a portable vehicle door and bumper guard 10, according to a preferred embodiment of the present invention.
Figure 1B:
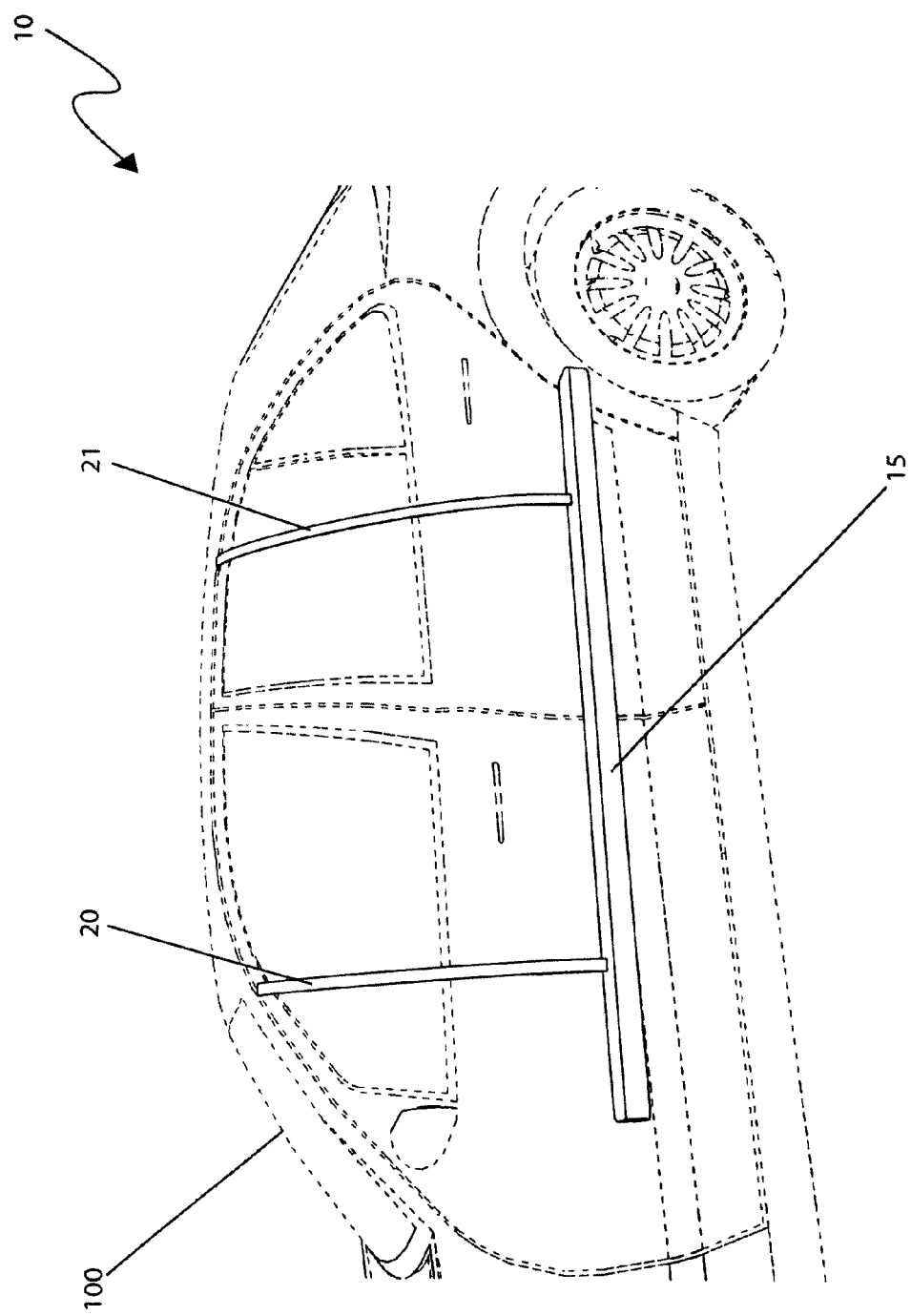
Figure 2:
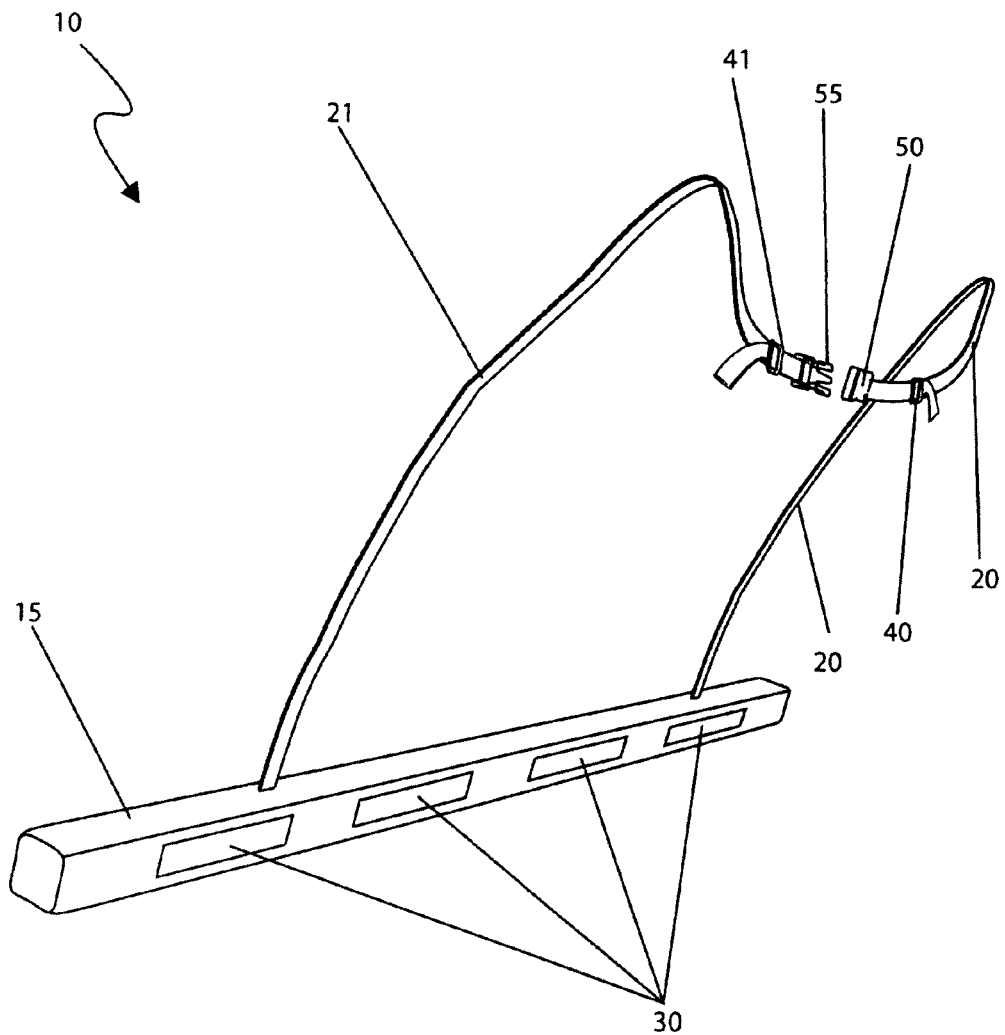
Figure 3:
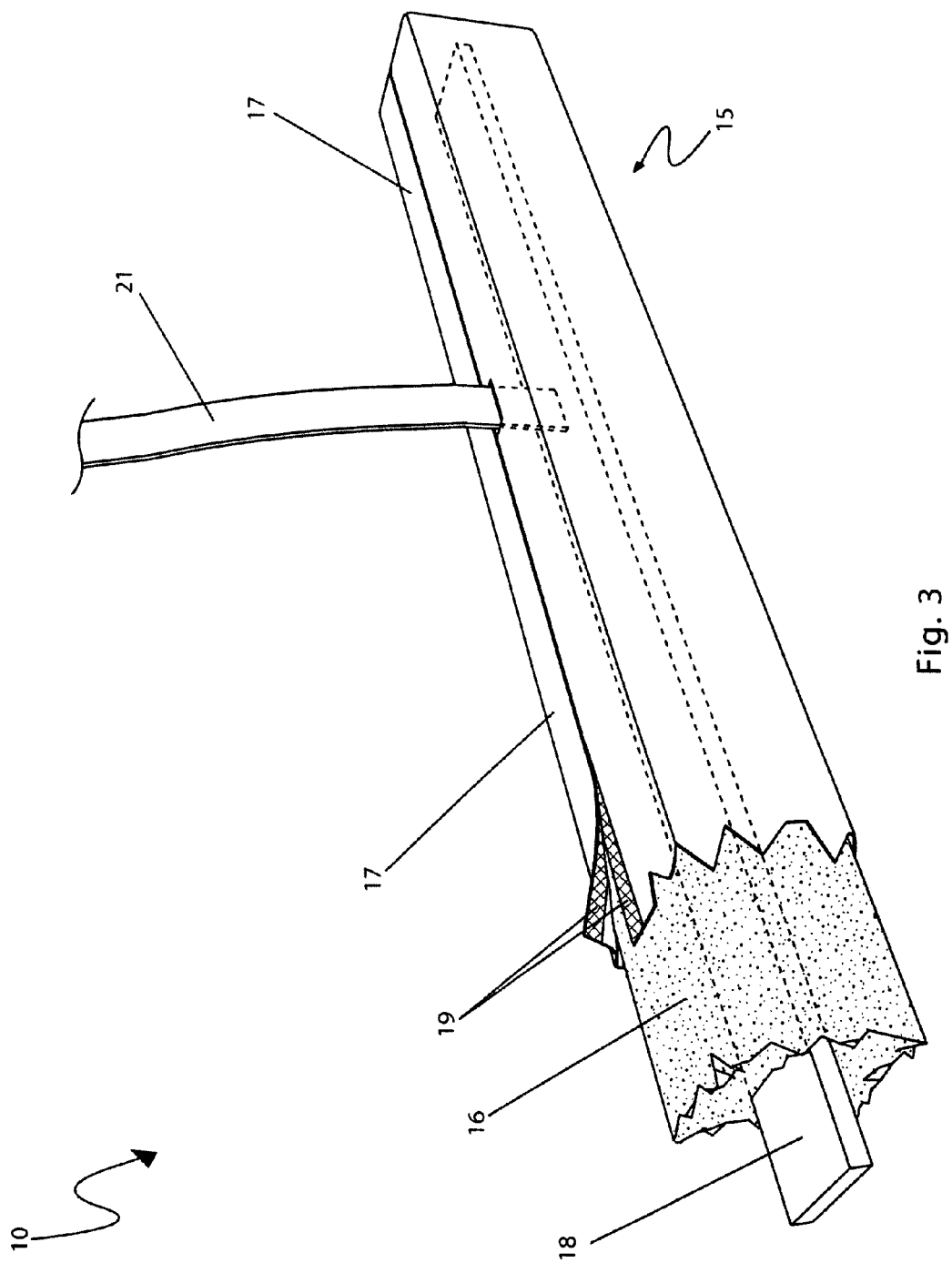

The best mode for carrying out the invention is presented in terms of its preferred embodiment, herein depicted within FIGS. 1 through 3. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a portable vehicle door and bumper guard (herein described as the "apparatus") 10, which provides a foam guard system that attaches to side and bumper areas of a parked vehicle 100, thereby protecting it from damage to paint and body. The apparatus 10 is made of closed cell polyethylene foam 16 supported by an interior core 18 and secured in place by means of magnetic strips 30 and flexible and adjustable strapping 20 enabling suspension of the apparatus 10 over doors, fenders, and bumper areas of a vehicle.

Referring now to FIGS. 1a and 1b, environmental views depicting a front and side application of the apparatus 10, respectively, thereto a vehicle 100, according to the preferred embodiment of the present invention, is disclosed. The apparatus 10 comprises a protective structure 15, a first strapping element 20, and a second strapping element 21. The protective structure 15 comprises preferably an elongated cushioning structure approximately four (4) to six (6) feet long having preferably a rectangular cross-section approximately six (6) inches square; however, the protective structure 15 may be introduced in a plurality of cross-sectional shapes such as, but not limited to, cylindrical, triangular, rectangular, or other shapes in a plurality of dimensions. The protective structure 15 is envisioned to conform thereto various shapes and sizes of doors, fenders, bumpers, and/or other vehicle areas. The strapping elements 20, 21 permit secure installation of the apparatus 10 along vehicle doors, fenders, bumpers, and/or other vehicle areas 100 at user selected heights and angles as desired, while conforming thereto various sizes and shapes of vehicles 100. The strapping elements 20, 21 are envisioned to be made preferably using flexible durable materials such as polyurethane, natural rubber, polyester, polypropylene, nylon, or the like.

Referring now to FIG. 2, a rear perspective view of the apparatus 10, according to the preferred embodiment of the present invention, is disclosed. The apparatus 10 comprises a protective structure 15, a plurality of magnetic strips 30, a first strapping element 20, a second strapping element 21, a first adjustment clip 40, a second adjustment clip 41, a female locking mechanism 50, and a male locking mechanism 55. The protective structure 15 is envisioned to be fabricated of high density foam 16, such as closed cell polyurethane foam, or other equivalent materials capable of withstanding compressive and tensile forces associated with incidental impact therefrom a bumper or car door edge of an encroaching vehicle 100. The properties of the protective structure 15 permit a high modulus as well as high elongation for optimal impact absorption capabilities. The magnetic strips 30 provide a stable positioning means to the apparatus 10 against metallic surfaces of a vehicle 100. The magnetic strips 30 are envisioned to be common non-metallic magnets produced in sheet form being made using conductive organic polymers. The magnetic strips 30 comprise preferably a plurality of horizontal rectangular shapes being affixed thereto a interior surface of the cover 17, preferably by textile techniques or processes common in the industry, such as sewing or serging; however, it is understood that various shaped magnetic strips 30 may be provided such as discs, triangles, or the like with equal benefit.

The first 20 and second 21 strapping elements further comprise female 50 and male 55 locking mechanisms, respectively, providing an attachment means of the apparatus 10 thereto various vehicle features such as a door, fender, bumper, and/or any other suitable area of the vehicle 100. The strapping elements 20, 21 are affixed thereto a top surface of the protective structure 15 by an embedded means at a proximal end and inserted therethrough integral slots thereon the female locking mechanism 50 and the male locking mechanism 55, respectively, at distal ends. The straps 20 are preferably, but not essentially, elastic, comprising of one (1) or more pieces of durable and resilient material. The locking mechanisms 50, 55 comprise two-piece interlocking side-release buckle device being made using rugged metallic or plastic materials. The male locking mechanism 55 is envisioned to comprise two (2) extendable prongs at a proximal end separated by an aperture and a means for receiving the second strapping element 21 at a distal end thereof. The female locking mechanism 50 generally comprises a main opening at a proximal end being sized to receive the male locking mechanism portion 55 with two (2) apertures on each side thereof. Said apertures are preferably adapted to engage the extendable prongs of the male locking mechanism 55 in order to secure said male locking mechanism portion 55 therein the female locking mechanism portion 50. The female locking mechanism 50 also comprises a means for receiving the first strapping element 20 at the distal end thereof. The extendable prongs may be compressed inwardly to disengage the male locking mechanism portion 55 therefrom the female locking mechanism portion 50, thereby allowing the male locking mechanism 55 and female locking mechanism 50 to be separated. The first 20 and second 21 strapping elements provide an attachment means thereto the locking mechanisms 50, 55 and the adjustment clips 40, 41. The first 20 and second 21 strapping elements are looped therethrough integral apertures of said female 50 and male 55 locking mechanisms forming loops therein and subsequently looping therethrough the first 40 and second 41 adjustment clips, respectively, also mounted along the strapping elements 20, 21 approximately one (1) foot therefrom the female 50 and male 55 locking mechanisms.

The adjustment clips 40, 41 provide a length adjustment means thereto the strapping elements 20, 21. Said strapping elements 20, 21 are adjustably lengthened or shortened to a desired span utilizing the adjustment clips 40, 41 installed thereon each of the two (2) strapping elements 20, 21 in a proximity thereto the female 50 and male 55 locking mechanisms. The adjustment clips 40 are envisioned to comprise common plastic or metal ladder lock or tri-glide devices providing a quick length adjustment or "synching" action thereto. The strapping elements 20, 21 permit the apparatus 10 to suspend, be lengthened, or be shortened to produce a desired position or angle while the magnetic strips 30 secure the apparatus 10 against a desired metallic vehicle surface 100.

Referring now to FIG. 3, a rear close-up view of a protective structure portion 15 of the apparatus 10, according to the preferred embodiment of the present invention, is disclosed. A portion of the protective structure 15 is depicted here comprising a second strapping element 21, a supporting core 18, a foam portion 16, a fabric cover 17, and a hook-and-loop fastener 19.

A second strapping element 21 is shown here being permanently affixed thereto the top surface of the protective structure 15 by an embedded means extending therethrough the fabric cover 17, foam 16, and being subsequently attached thereto the supporting core portion 18 forming a perpendicular connection thereto using methods such as sewing, heat welding, adhesives, riveting, or the like to provide a rugged and permanent attachment. The supporting core 18 provides further strength and flexible properties to the protective structure 15 being fabricated using plastic or metal materials having a memory property produced using an extrusion process, thereby enabling said protective structure 15 to be shaped in a variety of arcuate forms which emulate a contour of a door, bumper, fender, and/or any other portion of a vehicle 100 to be protected. The supporting core 18 comprises an integral and embedded element therein the foam portion 16 at a central location therein along a long axis thereof. The supporting core 18 is envisioned to comprise a rectangular cross-sectional design; however, may be provided as a round, square, or oval extruded shapes without deviating from the concept.

The cushioning foam portion 16 comprises a high shock absorption material, thereby protecting a vehicle door, fender, or bumper and is designed to provide superior abrasion resistance and high toughness properties capable of functioning in a wide temperature range. A soft protective fabric cover 17 provides an enveloping and protective means thereto the foam portion 16 providing additional protection thereto doors, bumpers, fenders, and/or any other portions of the vehicle 100 therefrom anticipated damage and scratches. The soft protective fabric cover 16 is envisioned to be a water and/or weatherproof textile material being removably attachable thereto the foam 16 for easy removal, cleaning, and servicing via an overlapping seam with integral hook-and-loop fasteners 19 located along a top edge thereof in a linear fashion being aligned thereto first 20 and second 21 strapping elements attachment regions.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIG. 1.

The method of installing and utilizing the apparatus 10 may be achieved by performing the following steps: opening vehicle doors, windows, hood, and/or trunk 100 as required to properly position the apparatus 10; inserting the protective structure 15 within the fabric cover 17 and securing using the hook-and-loop fastener 19, if not previously covered; positioning one (1) or more apparatuses 10 thereon desired vehicle surfaces at a front, rear, and/or side portion of said vehicle 100 using the magnetic strips 30; inserting the strapping elements 20, 21 therethrough a door, window, hood, and/or trunk opening 100; locking or fastening the strapping elements 20, 21 thereto each other by utilizing the female 50 and male 55 locking mechanisms; adjusting the length of the strapping elements 20, 21 as desired using the first 40 and second 41 adjustment clips to acquire a desired length or angle; utilizing the elastic properties of the supporting core 18 portion of the protective structure 15 to manually form a particular arcuate shape to maximize contact therewith a desired vehicle surface 100; closing said doors, windows, trunk and/or hood thereby securing the strapping elements 20, 21 and ultimately the apparatus 10 in place.

The apparatus 10 is arranged on a desired vehicle surface 100 so that the length of the protective structure 15 is typically parallel with the ground. It is envisioned that the user may use one (1) or a plurality of apparatuses 10 to be used simultaneously on various desired vehicle surfaces 100. The magnetic strips 30 and the conforming properties of the protective structure 15 prevent unwanted motion of the apparatus 10 after removably installing. The protective structure 15 is designed to absorb loads forced thereupon providing resistance to inward motion toward the vehicle while providing protection and cushioning preventing scratches, scuffs, nicks, and the like from occurring. The fabric cover 17 may be introduced to enclose the cushioning foam 16 further enhancing the avoidance of damage done thereupon the paint and finish of the vehicle 100. The strapping elements 20, 21 are envisioned to be fabricated of a durable elastic material with adjustment clips 40, 41 built thereon to adjustably lengthen or shorten said strapping elements 20, 21.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A protective apparatus for an exterior location of a motor vehicle comprised of a cushioning structure supported by a supporting core embedded therein and secured in place thereto said motor vehicle by means of a strapping assembly providing a removable securement means;
   wherein said cushioning structure comprises a high-density foam and further comprises an elongated structure and a rectangular cross-section;
   wherein said apparatus absorbs a load forced thereupon and provides resistance thereto an inward motion of said load while protecting and cushioning said motor vehicle;
   wherein said apparatus comprises a conformable means that enable said apparatus to conform thereto various shapes and sizes of vehicle doors, fenders, bumpers, or other desired protective areas of said motor vehicle; and,
   wherein said strapping assembly permits secure installation of said apparatus thereto said motor vehicle along vehicle doors, fenders, bumpers, or other desired protective areas of said motor vehicle at user-selected heights and angles.

2. The apparatus of claim 1, wherein said cushioning structure is approximately four (4) to six (6) feet long and said cross-section is approximately six (6) inches square.

3. The apparatus of claim 2, wherein said cushioning structure further comprises cylindrical closed-cell polyethylene material.

4. The apparatus of claim 1, wherein said strapping assembly further comprises:
   a first strapping element, wherein a first proximal end is affixed thereto a top surface of said supporting core;
   a female locking mechanism affixed thereto a distal end of said first strapping element;
   a first adjustment clip located thereon said first strapping element;
   a second strapping element, wherein a second proximal end is affixed thereto said top surface of said supporting core;
   a male locking mechanism affixed thereto a distal end of said first strapping element; and,
   a second adjustment clip located thereon said second strapping element;
   wherein said first and second strapping element each comprise at least one (1) piece of durable and resilient elastic material;
   wherein said male and female locking mechanisms provide said removable securement means;
   wherein said female locking mechanism is adapted to engage said male locking mechanism; and,
   wherein said first and second adjustment clips provide an adjustment means for lengthening, shortening, or otherwise adjusting said first and second strapping elements thereto a desired length.

5. The apparatus of claim 4, wherein said male and female locking mechanism comprise a two-piece interlocking side-release buckle device, wherein said male locking mechanism comprises two (2) extendable prongs at a proximal end separated by an aperture and a means for receiving said second strapping element at said second distal end thereof and said female locking mechanism comprises a main opening at a proximal end being sized to receive said male locking mechanism portion with two (2) apertures on each side thereof and a means for receiving said first strapping element at said first distal end thereof.

6. The apparatus of claim 5, wherein said first and second strapping elements comprise one of the following list: polyurethane, natural rubber, polyester, polypropylene, or nylon.

7. The apparatus of claim 1, further comprising a waterproof protective fabric cover removable via a fastening mechanism;
   wherein said cover provides an enveloping and protective means thereto said cushioning structure and supporting core;
   wherein said cover permits the passage of said first and second strapping elements.

8. The apparatus of claim 7, wherein said fastening mechanism comprises a hook-and-loop fastener assembly.

9. The apparatus of claim 8, further comprising a plurality of magnetic strips equidistantly-spaced therein an interior surface of said cover and affixed thereto;
   wherein said magnetic strips provide stable positioning means for said apparatus thereto a metallic surface of said motor vehicle.

10. The apparatus of claim 9, wherein said plurality of magnetic strips further comprise a horizontal rectangular non-metallic material of construction.

11. A method for protecting an exterior body of a motor vehicle comprising the following steps:
   providing a protective apparatus comprised of a cushioning structure supported by a supporting core embedded therein and secured in place thereto said motor vehicle by means of a strapping assembly providing a removable securement means and a plurality of magnetic strips thereon an inner surface;

determining a desired area or areas of said motor vehicle to be protected thereby said apparatus;

preparing said desired area or areas for installation of said apparatus, including opening vehicle doors, windows, hood, and trunk as required to properly position said apparatus;

inserting said cushioning foam with supporting core within a fabric cover and securing using a fastening mechanism;

positioning said apparatus thereon said desired area or areas of said motor vehicle, thereby enabling said plurality of magnetic strips to engage a metallic surface of said motor vehicle and secure thereto;

inserting said strapping assembly, comprising a first and second strapping element therethrough said vehicle doors, windows, hood, and trunk;

fastening said first strapping element thereto said second strapping element therewith a locking mechanism;

adjusting said first and second strapping element to a desired length with a first and a second adjustment clip located thereon said first and second strapping element, respectively;

conforming said apparatus thereto said desired area or areas of said motor vehicle to maximize contact therewith said desired area or areas; and, closing vehicle doors, windows, hood, and trunk thereby securing said strapping assembly and subsequently said apparatus.

12. The method of claim 11, further comprising the step of:

installing multiple apparatuses thereon another desired area or areas to be protected thereon said motor vehicle.

\* \* \* \* \*